(12) United States Patent
Gay

(10) Patent No.: US 6,199,651 B1
(45) Date of Patent: Mar. 13, 2001

(54) VEHICLE DRIVE WHEEL ASSEMBLY

(75) Inventor: Jordan L. Gay, Sarasota, FL (US)

(73) Assignee: Vectrix Corporation, Newport, RI (US)

( * ) Notice: Subject to any disclaimer, the term of this patent is extended or adjusted under 35 U.S.C. 154(b) by 0 days.

(21) Appl. No.: 09/074,468

(22) Filed: May 8, 1998

Related U.S. Application Data

(60) Provisional application No. 60/069,099, filed on Dec. 11, 1997.

(51) Int. Cl.$^7$ .............................. B62D 61/02; B60K 1/00
(52) U.S. Cl. ......................... 180/220; 180/227; 180/230; 180/65.5
(58) Field of Search ................................... 180/220, 227, 180/230, 65.5

(56) References Cited

U.S. PATENT DOCUMENTS

| | | |
|---|---|---|
| 904,721 | 11/1908 | Périllard . |
| 2,027,592 | 1/1936 | Hoffman et al. ........................ 74/413 |
| 2,244,875 | 6/1941 | Framhein ................................ 172/36 |
| 2,252,967 | 8/1941 | Forton .................................... 74/413 |
| 2,494,558 | 1/1950 | Irwin ...................................... 74/750 |
| 2,588,889 | 3/1952 | Sherwood .............................. 180/33 |
| 3,387,502 | 6/1968 | Tourneau ................................ 74/391 |
| 3,686,978 | 8/1972 | Knoblach et al. ..................... 74/801 |
| 3,820,617 | 6/1974 | Groff ................................. 180/19 R |
| 4,083,421 | 4/1978 | Van Horn et al. ..................... 180/88 |
| 4,132,281 | 1/1979 | Gaddi ..................................... 180/33 |
| 4,259,809 | 4/1981 | Mabuchi et al. ....................... 46/249 |
| 4,573,364 | 3/1986 | Givan ..................................... 74/7 E |
| 4,618,102 | 10/1986 | Meis et al. ............................ 239/737 |
| 4,693,359 | 9/1987 | Mattei et al. ....................... 198/474.1 |
| 4,721,177 | 1/1988 | Qizhen .................................. 180/205 |
| 4,799,564 | 1/1989 | Iijima et al. .......................... 180/65.5 |
| 4,905,787 | 3/1990 | Morin .................................... 180/209 |
| 4,930,590 | 6/1990 | Love et al. .............................. 180/55 |
| 5,014,800 | 5/1991 | Kawamoto et al. ................. 180/65.5 |
| 5,272,938 | * 12/1993 | Hsu et al. ............................. 74/594.1 |
| 5,322,141 | 6/1994 | Brunner et al. ...................... 180/65.5 |
| 5,382,854 | 1/1995 | Kawamoto et al. ............... 310/67 R |
| 5,450,915 | 9/1995 | Li ......................................... 180/65.5 |
| 5,472,059 | * 12/1995 | Schlosser ............................ 180/65.5 |
| 5,524,726 | * 6/1996 | Wright .................................. 180/220 |
| 5,553,881 | * 9/1996 | Klassen et al. ....................... 280/284 |
| 5,581,136 | 12/1996 | Li ....................................... 310/67 R |
| 5,613,569 | 3/1997 | Sugioka et al. ...................... 180/68.5 |
| 5,633,544 | 5/1997 | Toida et al. ........................ 310/67 R |
| 5,647,450 | 7/1997 | Ogawa et al. ........................ 180/220 |
| 5,685,798 | 11/1997 | Lutz et al. ............................. 475/331 |
| 5,782,716 | 7/1998 | Hukui et al. .......................... 475/149 |

* cited by examiner

Primary Examiner—Kevin Hurley
(74) Attorney, Agent, or Firm—Pennie & Edmonds LLP

(57) ABSTRACT

A vehicle drive assembly with a motor configured for driving the vehicle and including a rotatably driven motor shaft. A first swing arm has a first end housing the motor and a second end pivotably and supportively attachable to a vehicle body, with an elongated portion joining the ends. The vehicle also has a gearbox housing configured for transmitting torque to a road surface through a road engaging member, and a transmission directly engaged with the motor shaft and housed within the gearbox housing. The transmission is configured for transmitting torque from the motor shaft to the housing. A second swing arm is pivotably and supportively attachable to the vehicle body. An axle is fixed to the second swing arm, received within the gearbox housing, and attached to the transmission such that the second swing arm is supported by the transmission. The transmission preferably includes a planetary gear reduction unit with a gear carrier rotationally fixed to the first swing arm and a plurality of gears operatively associated with the shaft and the gearbox housing to transmit torque therebetween. Preferably at least one of the gears is mounted to the gear carrier, more preferably a plurality of planetary gears is mounted to the gear carrier.

21 Claims, 3 Drawing Sheets

VEHICLE DRIVE WHEEL ASSEMBLY

This application claims priority to provisional application No. 60/069,099, filed on Dec. 11, 1997.

FIELD OF THE INVENTION

The present invention relates to a drive wheel assembly for a scooter. More particularly, the invention relates to a scooter wheel driven by a motor housed in an end of a swing arm disposed opposite an end pivotably attached to the scooter body, in which a motor shaft is directly engaged to a transmission mounted within a wheel.

BACKGROUND OF THE INVENTION

As exacerbation of air pollution by large numbers of internal combustion vehicles has become a significant concern in large cities, efforts are being made worldwide to provide efficient electric powered vehicles which do not discharge pollutant emissions. Large cities in developing countries which include high concentrations of scooters powered by two stroke engines are particularly affected by vehicle pollution. These two stroke scooters produce large quantities of pollutants and significant noise. Electric powered scooters, on the other hand, offer a means of transportation that emits substantially no pollutants and produces very little noise.

Electric-powered two-wheeled vehicles have been developed. For instance, U.S. Pat. No. 5,272,938 teaches a bicycle with an electric motor mounted inside a front wheel. The motor is disposed within a housing. The motor spins a sun wheel, which spins three planet wheels meshed therewith. The planet wheels are meshed with and rotate against a ring gear that is rotationally fixed to an axle, which is fixed to the bicycle fork. Shafts of the planet wheels are fixed to a swivel block. The rotation of the planet wheels against the fixed ring gear causes the swivel block to rotate about the axle. Through a clutch wheel, the rotating swivel block rotates the housing. The housing is formed from two halves of equal diameter. Wheel spokes are attached to the housing through both housing halves. Thus, rotation of the housing causes the bicycle spokes and wheel to turn, propelling the bicycle.

In the arrangement taught in the '938 patent, however, the motor is unusually thin to fit unobtrusively within the wheel. This arrangement precludes an ideally shaped motor, which is significantly wider and more powerful.

Other electric powered vehicles are also taught, for example in U.S. Pat. No. 5,322,141. This reference shows an electric motor housed within a closed casing that is connected to a passenger carrying vehicle through suspension members which are pivoted laterally from the vehicle and from the casing. A shock absorber absorbs mechanical shocks between the casing and the vehicle.

The arrangement taught is unsuitable for a scooter or other small vehicles in which swing arms face aft and pivot parallel to the wheel about an axis transverse to the vehicle.

U.S. Pat. Nos. 5,613,569 and 5,647,450 teach electrically powered scooters, each with an electric motor placed in a pivotable swing power unit attached to a main frame and to a wheel. The motor is located at the end of the swing unit attached to the body. As explained in the '569 patent, this placement requires a transmission to provide power to the wheel disposed within the swing unit, such as a belt. The remote placement of the motor from the wheel and the long transmission reduces the potential efficiency of the drive system.

An efficient drive wheel assembly is needed for a scooter suitable for use with an adequately sized motor and which does not suffer from inefficiencies produced by a placement of the motor remotely from the wheel.

SUMMARY OF THE INVENTION

The invention provides a vehicle drive assembly for a scooter with a motor configured for driving the vehicle that includes a rotatably driven motor shaft. The scooter preferably has first and second swing arms, each with a first end fixed to the motor and a second end pivotably and supportively attachable to a vehicle body. The first swing arm also preferably includes a substantially rigid elongated portion fixing together its first and second ends. The motor is preferably housed within the first swing arm.

A wheel of the scooter has a gearbox housing that is configured for transmitting torque to a road surface through a road engaging member, such as a tire. A transmission housed within the gearbox housing is directly engaged with the motor shaft, reducing inefficiencies caused by belts, chains, or other transmissions otherwise required to couple operatively engage the motor with the transmission. The transmission is configured for transmitting torque from the motor shaft to the housing.

The transmission preferably includes a gear carrier rotationally fixed to the first swing arm and a plurality of gears operatively associated with the shaft and the gearbox housing such that torque is transmitted between the shaft and the gearbox housing. At least one of the gears is mounted to the gear carrier. The transmission is preferably a planetary gear reduction unit with a sun gear fixed to the shaft, at least one planetary gear mounted to the gear carrier, and a ring gear fixed to the gearbox housing.

In the preferred embodiment, an axle is fixed to the second swing arm, received within the gearbox housing, and attached to the transmission, preferably to the gear carrier. In this way, the transmission supports the second swing arm. In order to attach the second swing arm to the axle, the second swing arm defines an attachment opening to which the axle is fixable when received therethrough.

DETAILED DESCRIPTION OF THE PREFERRED EMBODIMENTS

Figure 1:
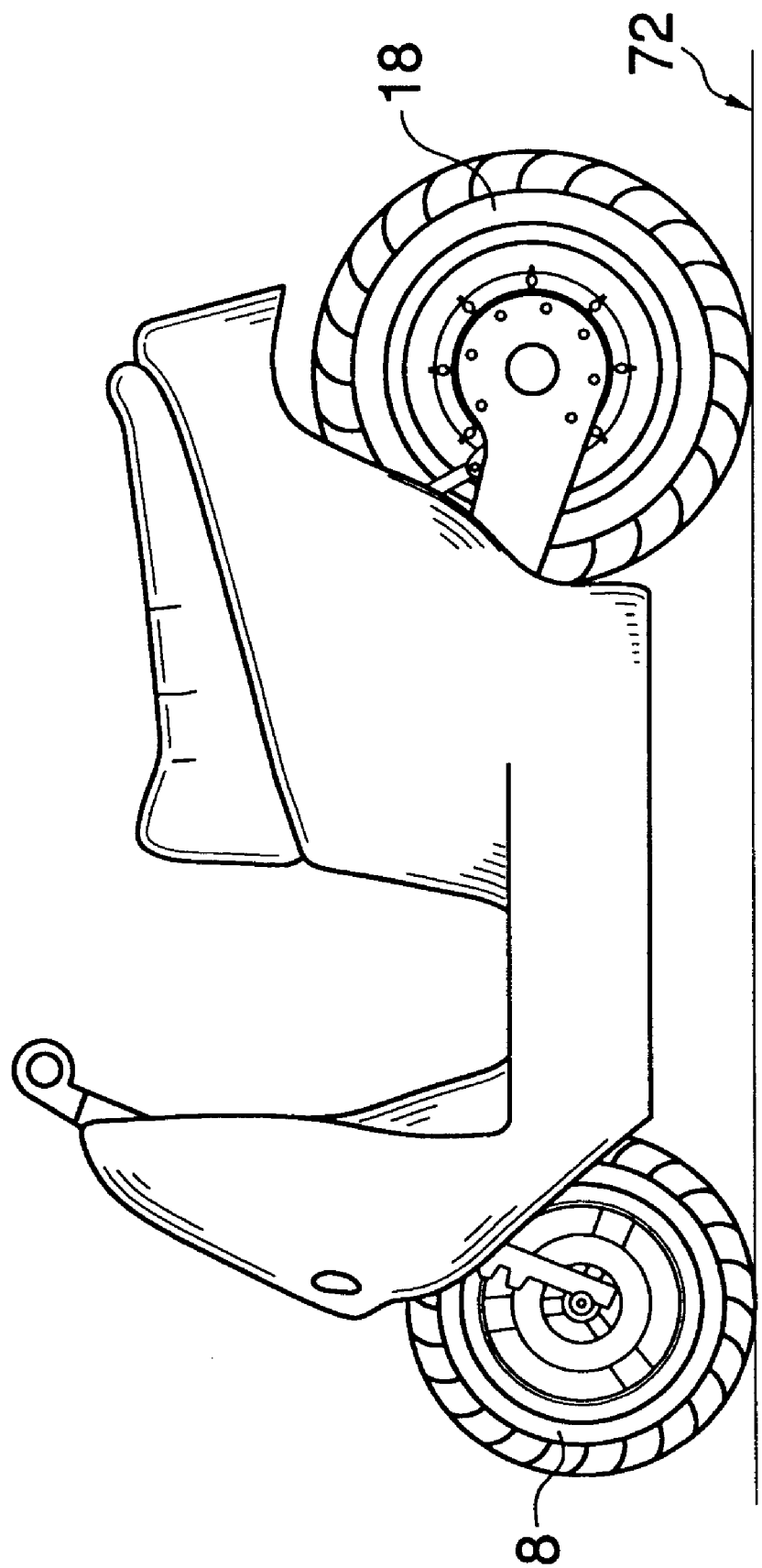
FIG. 1 is a left side view of a scooter according to the invention.

FIG. 1 shows a scooter according to the invention with two wheels, a front steerable wheel 8 and a rear drive wheel 18.

Figure 2:
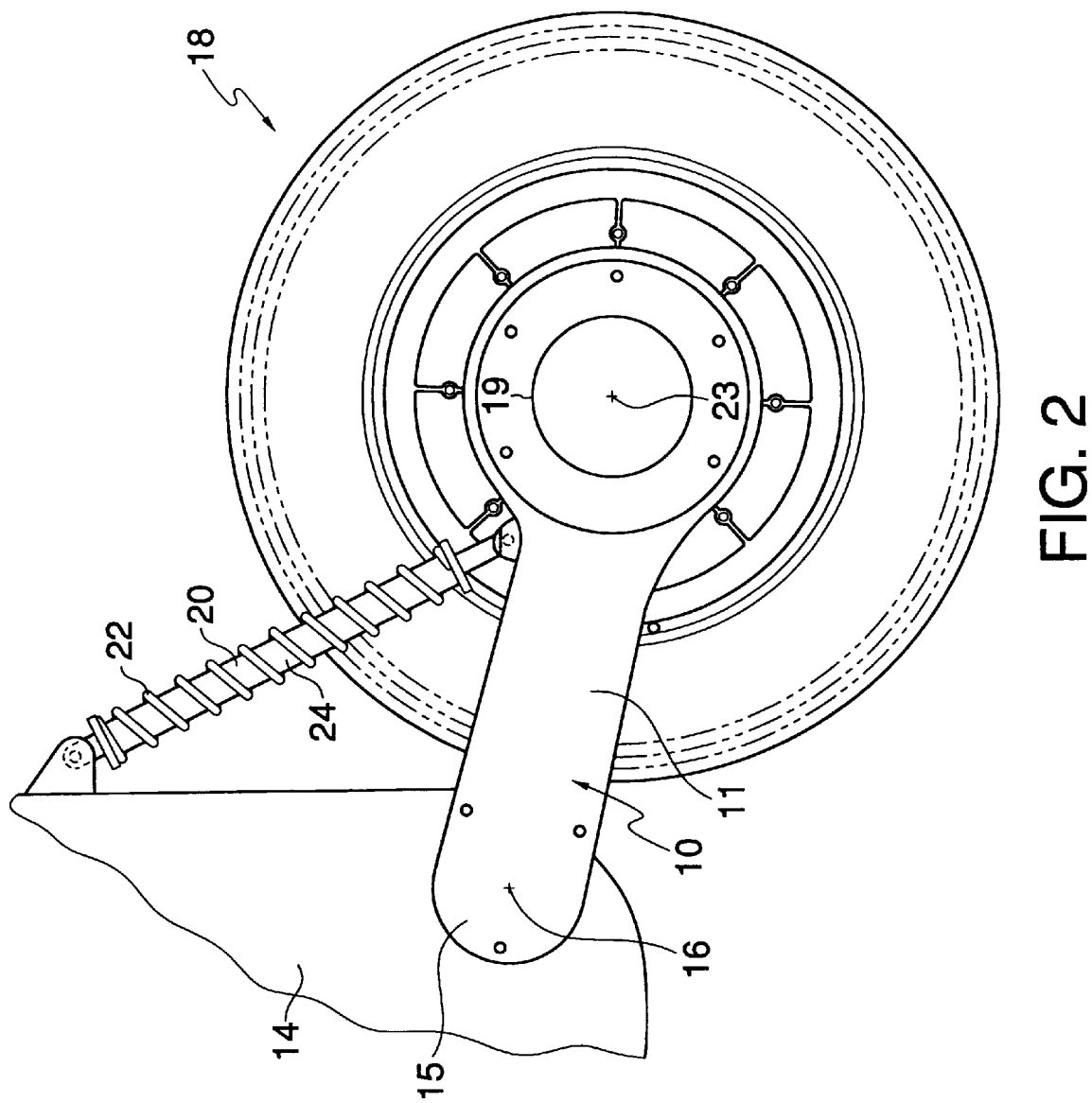
FIG. 2 is a left side view of a drive wheel assembly of the scooter.
Figure 3:
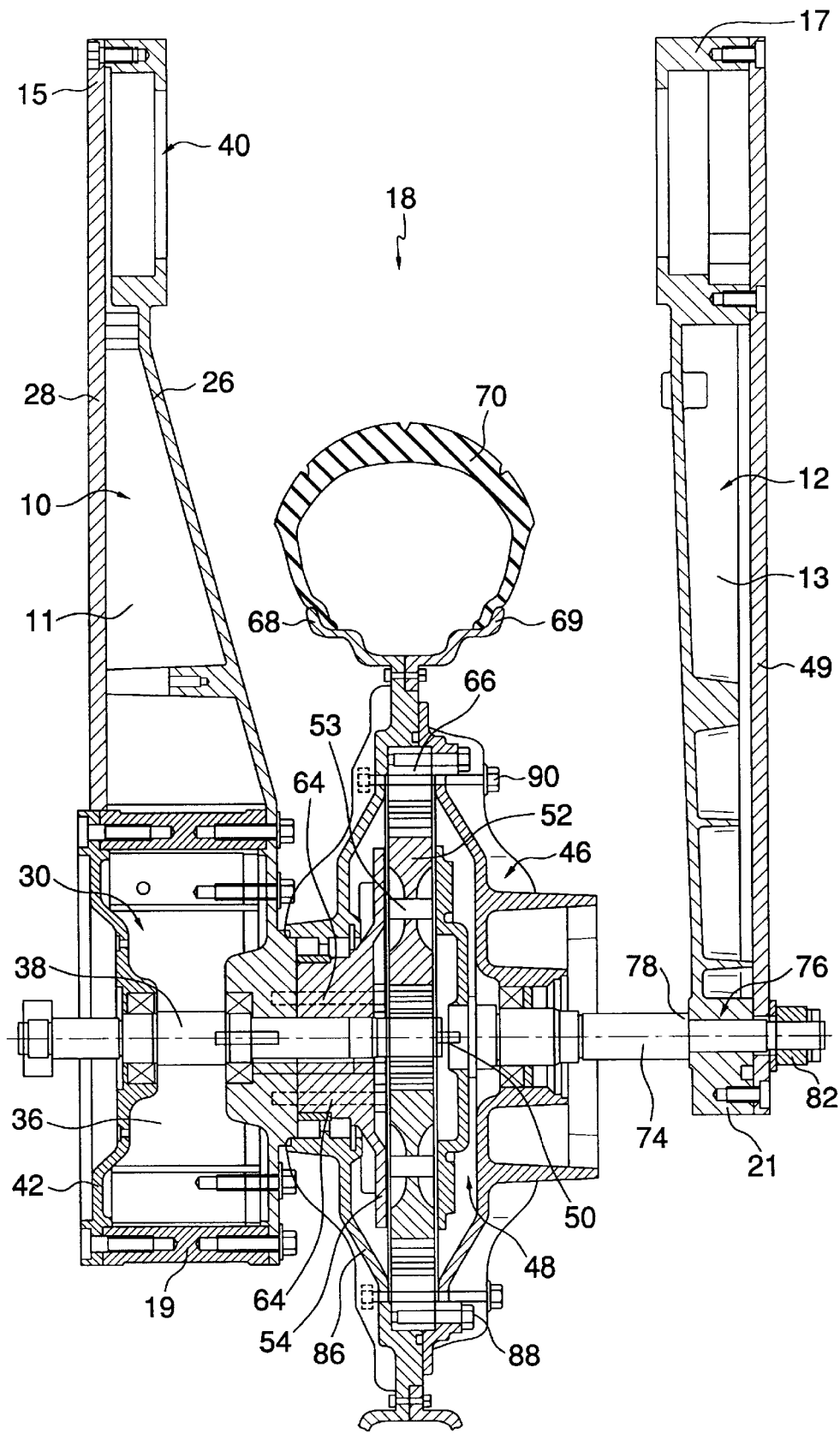
FIG. 3 is a cross-sectional top view of the drive wheel assembly.

Referring to FIGS. 2 and 3, left and right swing arms 10 and 12 are pivotably connected to a scooter body 14 about a pivot axis 16. The swing arms 10 and 12 are also connected to wheel 18, thus pivotably attaching the wheel 18 to the body 14 for pivoting in a pivot plane disposed substantially in parallel with rotation of the wheel 18, about an axis substantially parallel to wheel axis 23 and substantially transverse to the scooter. The swing arms 10 and 12 have rigid elongated portions 11 and 13 that join swing-arm body-ends 15 and 17 and wheel ends 19 and 21, which are respectively rotatably attached to the scooter body 14 and to the wheel 18.

Shock absorbers 20 are connected between the swing arms 10 and 12 and the body 14 to absorb mechanical shocks therebetween. Preferably, the shock absorbers 20 include springs 22 as well as dampers 24 to both support the swing arms 10 and 12 and dampen movement between them and the body 14.

Referring to FIG. 3, the left swing arm 10 includes a swing arm frame 26 to which is fixed a cover 28. The swing arm frame 26 carries structural loads generated from supporting the scooter body 14.

An electric motor 30 is housed within the swing arm frame 26 outside the wheel 18. A motor cover 42 is secured to the swing arm frame 26, enclosing the motor 30. The motor 30 also includes a rotor 36 that is fixed to shaft 38. Power is preferably supplied to the motor 30 from batteries via a controller (not shown) located in the scooter body 14 through cables (not shown) that pass through an opening 40 in the swing arm frame 26. The controller can alternatively be placed in the left swing arm 10. A speed sensor is preferably mounted to the shaft 38 to provide speed information to the controller. When electrical current flows through the motor 30, rotor 36 rotates shaft 38 to drive wheel 18.

As shown in FIG. 3, wheel 18 includes a gearbox housing 46 that houses a wheel transmission 48 therein. The gearbox housing 46 includes left and right halves 86 and 88 fixed to each other with fasteners 90 and structurally supporting a portion of the transmission. The transmission is preferably a planetary gear reduction unit that provides a reduction of between 6:1 and 14:1, according to the motor and wheel size employed. Also shown in FIG. 3 is a right swing arm cover 49, covering the interior of the right swing arm 12.

As shown in FIG. 3, a sun gear 50 is fixed to the shaft 38 driven by the motor 30, and is thus directly engaged thereto. The motor shaft 38 is preferably hardened steel to reduce torsional strain in the shaft between the motor 30 and the sun gear 50. Planetary gears 52 are mounted on spindles 53 of gear carrier 54. The planetary gears 52 are meshed with the sun gear 50 and also with a ring gear 66 that is disposed concentrically with the sun gear 50. The ring gear 66 is fixed to the gearbox housing 46, which is itself fixed with wheel half-rims 68 and 69, to which mounts a road-surface engaging member such as a tire 70.

Preferably, the majority of the planetary gears 52, two of the three in the preferred embodiment, are disposed beneath the sun gear 50 to distribute support of the sun gear 50 amongst as many of the planetary gears 52 as possible. Also, preferably at least one of the planetary gears 52 is disposed above the sun gear 50 for preventing radial displacement thereof when the scooter is driven over rough terrain.

The gear carrier 54 is configured to resist rotation caused by the motor 30. This is accomplished in the preferred embodiment as the gear carrier 54 is fixed to the left swing arm 10 by a plurality of fasteners 64. Thus, torque is transmitted from the motor shaft 38, through the sun gear 50, to the planetary gears 52, then to the ring gear 66 and gearbox housing 46, and finally to a road surface 72, driving the scooter. The gearbox housing 46, being fixed to the tire 70, rotates with the tire 70 as the tire 70 rolls over the road surface 72.

The gear carrier 54 is fixed to an axle 74, which protrudes coaxially from the gearbox housing 46 and is fixed to the right swing arm 12. The axle 74 includes a shoulder 78 that has a diameter greater than opening 76 in the right swing arm 12 and rests against the right swing arm 12, limiting penetration of the axle 74 into the opening 76. A nut 82 secures the axle 74 to the right swing arm 12. Having two swing arms reduces twisting moments produced by the wheel 18, as forces from the wheel 18 are supported through both swing arms 10 and 12.

One of ordinary skill in the art can envision numerous variations and modifications. For example, elements described as being on the left and right sides of the scooter may be reversed. All of these modifications are contemplated by the true spirit and scope of the following claims.

What is claimed:

1. A vehicle drive assembly comprising:
    a motor configured for driving the vehicle and including a rotatably driven motor shaft;
    at least one swing arm comprising a first swing arm having a first portion to which the motor is mounted and a second portion pivotably and supportively attachable to a vehicle body;
    a gearbox housing configured for transmitting torque to a road surface through a road engaging member; and
    a transmission directly engaged with the motor shaft and housed within the gearbox housing and configured for transmitting torque from the motor shaft to the housing;
    wherein the shaft is rotatable with respect to the first swing arm.

2. The drive assembly of claim 1, wherein the at least one swing arm includes a second swing arm pivotably and supportively attachable to the vehicle body, the drive assembly further comprising an axle fixed to the second swing arm, received within the gearbox housing, and attached to the transmission such that the second swing arm is supported by the transmission.

3. The drive assembly of claim 2, wherein the second swing arm defines an attachment opening, and the axle is fixable to the second swing arm when received through the attachment opening.

4. The drive assembly of claim 1, wherein the gearbox housing is rotationally fixed with respect to the road engaging member.

5. The drive assembly of claim 1, wherein the first and second portions are disposed substantially at first and second ends of the at least one swing arm.

6. The drive assembly of claim 5, wherein the first swing arm includes a substantially rigid elongated portion fixing together the first and second ends.

7. A vehicle comprising:
    the drive assembly of claim 1;
    a vehicle body wherein the second portion of the first swing arm of the drive assembly is pivotally and supportively attached to the vehicle body; and
    front and rear wheels supportively connected to the vehicle body;
    wherein the front wheel comprises a single wheel.

8. The vehicle of claim 7, further comprising a fork attaching the front wheel to the vehicle body.

9. The vehicle of claim 7, further comprising handle bars operatively associated with the front wheel for steering the front wheel.

10. The vehicle of claim 7, wherein the back wheel comprises a single wheel, such that the vehicle is a two wheel vehicle.

11. The drive assembly of claim 1, wherein the motor shaft is substantially coaxial with the road engaging member.

12. The drive assembly of claim 1, wherein:
    the road engaging member is rotatable with respect to the swing arm about a rotation axis; and the at least one swing arm is configured for attaching the road engaging member to the vehicle body pivotably about a pivoting axis oriented generally parallel to the rotation axis.

13. A vehicle comprising:

the drive assembly of claim 1; and a vehicle body, wherein the second portion of the first swing arm of the drive assembly is pivotably and supportively attached to the vehicle body; and wherein the vehicle is a non-pedal-driven vehicle.

14. The vehicle of claim 13, wherein the vehicle is a scooter.

15. A vehicle drive assembly, comprising:

a motor configured for driving the vehicle and including a rotatable driven motor shaft;

at least one swing arm comprising a first swing arm having a first portion to which the motor is mounted and a second portion pivotably and supportively attachable to a vehicle body;

a gearbox housing configured for transmitting torque to a road surface through a road engaging member; and a transmission directly engaged with the motor shaft and housed within the gearbox housing and configured for transmitting torque from the motor shaft to the housing, wherein the transmission comprises:
 a gear carrier rotationally fixed to the first swing arm; and
 a plurality of gears operatively associated with the shaft and the gearbox housing such that torque is transmitted between the shaft and the gearbox housing;
 wherein at least one of the gears is mounted to the gear carrier.

16. The drive assembly of claim 15, wherein the plurality of gears includes a sun gear fixed to the shaft, at least one planetary gear mounted to the gear carrier, and a ring gear fixed to the gearbox housing.

17. The drive assembly of claim 4, further comprising an axle fixed to the gear carrier and fixable to a second swing arm.

18. The drive assembly of claim 15, wherein the gear carrier is fixed against relative rotation to the at least one swing arm.

19. A vehicle drive assembly, comprising:

a motor configured for driving the vehicle and including a rotatable driven motor shaft;

at least one swing arm comprising a first swing arm having a first portion and a second portion that is pivotably and supportively attachable to a vehicle body, wherein the motor is housed within the first portion of the swing arm;

a gearbox housing configured for transmitting torque to a road surface through a road engaging member; and a transmission directly engaged with the motor shaft and housed within the gearbox housing and configured for transmitting torque from the motor shaft to the housing.

20. A vehicle drive assembly comprising:

a motor configured for driving the vehicle and including a rotatably driven motor shaft;

at least one swing arm comprising a first swing arm having a first portion and a second portion that is pivotably and supportively attachable to a vehicle body; and a wheel including a road engaging member and a transmission assembly mounted within the wheel and configured for transmitting torque to a road surface through the road engaging member; and wherein the transmission is directly connected with the motor shaft and configured for transmitting torque from the motor shaft to the road engaging member, wherein the motor is mounted to the first portion of the swing arm outside the wheel.

21. The wheel assembly of claim 20, wherein the transmission comprises a sun gear, at least one planetary gear mounted around the sun gear and meshed therewith, and a ring gear disposed around the at least one planetary gear and meshed therewith.

* * * * *